(12) United States Patent
Iijima

(10) Patent No.: US 9,465,381 B2
(45) Date of Patent: Oct. 11, 2016

(54) SERVO CONTROL DEVICE HAVING AUTOMATIC FILTER ADJUSTMENT FUNCTION BASED ON EXPERIMENTAL MODAL ANALYSIS

(71) Applicant: FANUC Corporation, Yamanashi (JP)

(72) Inventor: Kazunori Iijima, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/946,646

(22) Filed: Nov. 19, 2015

(65) Prior Publication Data

US 2016/0170400 A1 Jun. 16, 2016

(30) Foreign Application Priority Data

Dec. 10, 2014 (JP) .................. 2014-250242

(51) Int. Cl.
G05B 1/02 (2006.01)
G05B 19/19 (2006.01)

(52) U.S. Cl.
CPC .................. G05B 19/19 (2013.01)

(58) Field of Classification Search
CPC .... G05B 19/19; G05B 19/404; G05B 15/02; B60L 2240/421; E02F 9/2075
See application file for complete search history.

(56) References Cited

U.S. PATENT DOCUMENTS

| | | | | |
|---|---|---|---|---|
| 5,589,748 A * | 12/1996 | Kazama | ................ | G05B 11/32 318/560 |
| 6,590,358 B1 * | 7/2003 | Tsutsui | .................... | G05B 5/01 318/560 |
| 2004/0183494 A1 * | 9/2004 | Nagaoka | ................ | G05B 19/19 318/632 |
| 2011/0050146 A1 * | 3/2011 | Okita | ................... | G05B 19/404 318/631 |
| 2013/0214718 A1 * | 8/2013 | Ikeda | ..................... | G05B 11/42 318/609 |

FOREIGN PATENT DOCUMENTS

| | | |
|---|---|---|
| JP | 6-78575 A | 3/1994 |
| JP | 2006-227793 A | 8/2006 |
| JP | 2008-259271 A | 10/2008 |
| JP | 2009-165258 A | 7/2009 |
| JP | 2014-222972 A | 11/2014 |
| WO | 2014/156164 A1 | 10/2014 |

* cited by examiner

*Primary Examiner* — Shawki S Ismail
*Assistant Examiner* — Zoheb Imtiaz
(74) *Attorney, Agent, or Firm* — Hauptman Ham, LLP

(57) ABSTRACT

A servo control device includes: a speed control loop including a speed command generating unit, a torque command generating unit, and a speed detecting unit; a sine wave disturbance input unit; a frequency response calculating unit estimating a gain and phase of speed control loop input/output signals; a resonance frequency detecting unit; a resonance mode characteristic estimating unit estimating resonance characteristics from the frequency response at a resonance frequency and frequencies therearound; a rigid-body mode characteristic estimating unit estimating rigid-body characteristics from the frequency response in a low-frequency band; a filter attenuating a component in a particular frequency band in a torque command; and a filter adjusting unit making setting so that the filter has specified characteristics. The filter adjusting unit further includes a filter adjusting part attenuating a component in a frequency band corresponding to a resonance mode estimated by the resonance mode characteristic estimating unit.

3 Claims, 8 Drawing Sheets

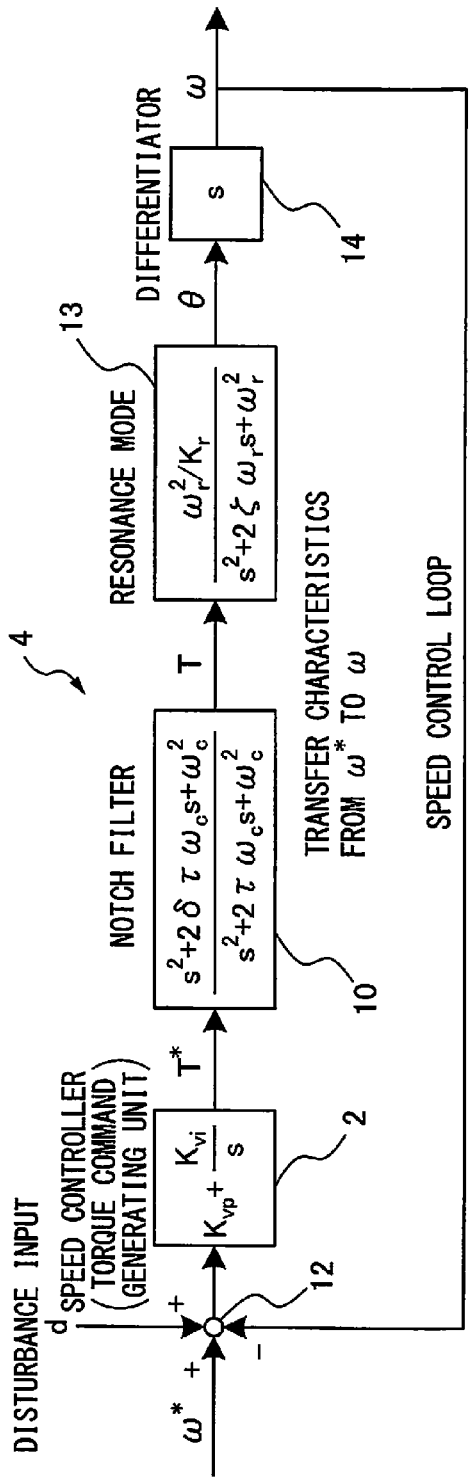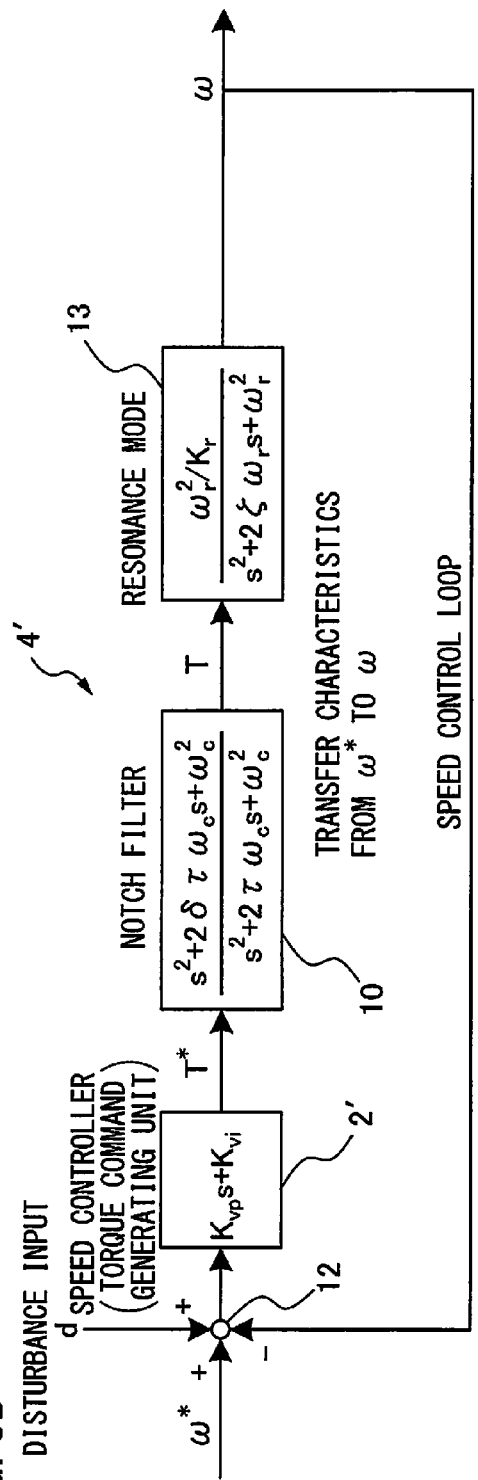

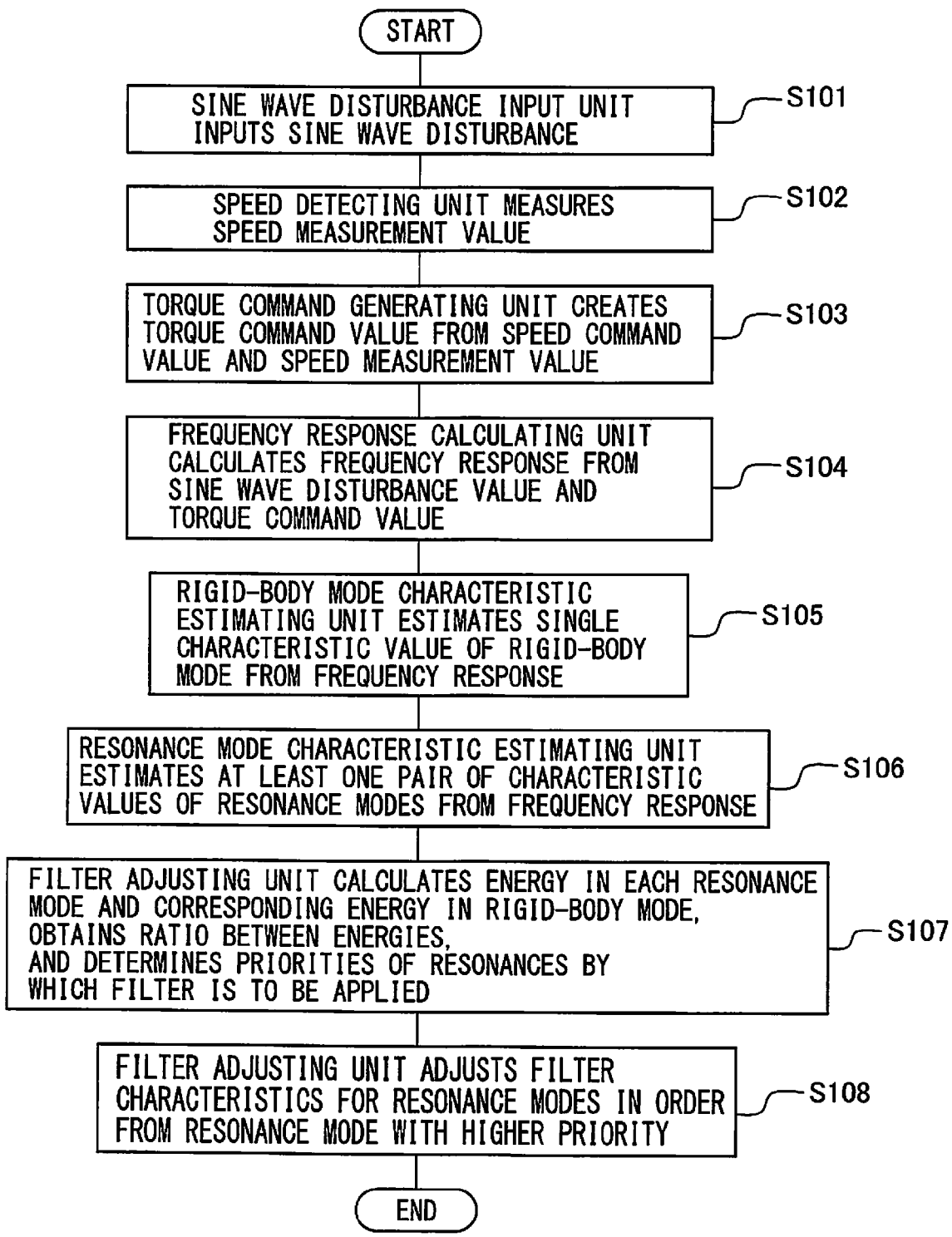

SERVO CONTROL DEVICE HAVING AUTOMATIC FILTER ADJUSTMENT FUNCTION BASED ON EXPERIMENTAL MODAL ANALYSIS

RELATED APPLICATIONS

The present application claims priority to Japanese Application Number 2014-250242, filed Dec. 10, 2014, the disclosure of which are hereby incorporated by reference herein in its entirety.

BACKGROUND OF INVENTION

1. Field of the Invention

The present invention relates to a servo control device for driving a servomotor and particularly relates to a servo control device having an automatic filter adjustment function based on experimental modal analysis.

2. Description of the Related Art

Many servo control devices use a technique of applying a band-rejection filter to a torque command value, in order to stabilize the servo control systems of machine tools. In filter adjustment, it is common to carry out sine wave sweep or square wave sweep for a speed control loop including a torque command generating unit and a speed detecting unit, to thereby measure a frequency response of the control loop and to obtain a resonance frequency of the control loop.

In consideration that the calculation load on each filter is extremely heavy, it is difficult to increase the number of filters for period calculation in real-time. For this reason, the number of filters is limited by the constraint of the performance of hardware to be used for servo control. Hence, by using a finite number of filters, adjusting the filters to stabilize the control system in an efficient manner is of great importance. For this purpose, there is a need for a technique that enables selective application of a filter that is considered to provide a high stabilization effect, by evaluating an oscillation risk at each resonance frequency.

In view of the fact that automatic filter adjustment is possible in principle as long as resonance is detected, a number of techniques for automatic filter adjustment have been proposed (e.g. Japanese Laid-open Patent Publication No. H06-78575, to be referred to as "Patent Document 1" below). Patent Document 1 discloses automatic adjustment of a notch filter by obtaining amplitude ratios and frequencies from measurement data to carry out parameter adjustment including discretization calculation. However, it is difficult to adjust the width and the depth of the filter with this technique.

While automatic filter adjustment has the advantage that the results of the adjustment vary little, exact rules for the automatic adjustment need to be defined. There have been proposed techniques for adjusting a whole set of servo control parameters including control gain and feedforward while estimating a transfer function (e.g. Japanese Laid-open Patent Publication No. 2008-259271, to be referred to as "Patent Document 2" below). This known technique is advantageous in that the whole adjustment can be made by taking into account stable operation of a control system. Patent Document 2 discloses automatic adjustment of control gain, notch filter, and feedforward. In this technique, the moment of inertia of a mechanical system is identified, the transfer function of the mechanical system is generated, and the inverse transfer function of the generated transfer function (the reciprocal of the transfer function of the mechanical system) is obtained, and thereby a feedforward coefficient is determined. Filter adjustment itself is carried out on the basis of an oscillation frequency and a control gain. However, Patent Document 2 does not disclose any method for clearly defining the width or depth of a filter.

Examples of applying an experimental modal analysis for servo adjustment have been reported (e.g. Japanese Laid-open Patent Publication No. 2006-227793, to be referred to as "Patent Document 3" below). Patent Document 3 proposes a method for determining a group of constants for a transfer function and describes that a gain, a low-pass filter, and a notch filter for servo control can be adjusted by the use of the method. However, Patent Document 3 does not disclose any technique for selecting a resonance frequency.

SUMMARY OF THE INVENTION

The present invention has as an object to provide a servo control device capable of each of: adjusting a finite number of filters by estimating a transfer function from a measured frequency response (Claim 1); finding, with a high priority, a filter frequency possible to provide a high stabilization effect, by determining a resonance mode having a high oscillation risk (Claim 2); and predicting and displaying the filter effect by calculation using a mathematical expression without actual filter application (Claim 3).

The servo control device according to one embodiment of the present invention includes: a speed command generating unit that generates a speed command value for a servomotor; a torque command generating unit that generates a torque command value for the servo motor based on the speed command value; a speed detecting unit that detects speed of the servomotor driven based on the torque command value; a speed control loop that includes the speed command generating unit, the torque command generating unit, and the speed detecting unit; a sine wave disturbance input unit that inputs sine wave disturbance to the speed control loop; a frequency response calculating unit that estimates a frequency response including a gain and a phase of speed control loop input/output signals based on an output from the speed control loop at time when the sine wave disturbance is input to the speed control loop; a resonance frequency detecting unit that detects a resonance frequency, at which the gain of the frequency response is local maximum; a resonance mode characteristic estimating unit that estimates a resonance characteristic based on the frequency response at the resonance frequency and frequencies around the resonance frequency; a rigid-body mode characteristic estimating unit that estimates a rigid-body characteristic based on the frequency response in a low-frequency band; a filter that attenuates a component in a particular frequency band included in a torque command; and a filter adjusting unit that makes setting of the filter so that the filter has a specified characteristic. The filter adjusting unit further includes a filter adjusting part that attenuates a component in a frequency band corresponding to a resonance mode estimated by the resonance mode characteristic estimating unit.

BRIEF DESCRIPTION OF THE DRAWINGS

These or other objects, features, and advantages of the present invention are to be more apparent through the following description of embodiments associated with the accompanying drawings, in which:

FIG. 3A is a control block diagram illustrating components of a speed control loop in a motor drive system as a continuous system;

FIG. 3B is a control block diagram illustrating components of a speed control loop in a motor drive system as a continuous system;

FIG. 6 is a flowchart for illustrating an operation procedure of a servo control device according to a second embodiment of the present invention;

DETAILED DESCRIPTION

A servo control device according to the present invention is described below with reference to the drawings. Note, however, that the technical scope of the present invention is not limited to the embodiments and includes the invention described in the scope of claims and the equivalents thereto.

First Embodiment

Filter Adjustment Based on Modal Analysis

Figure 1:
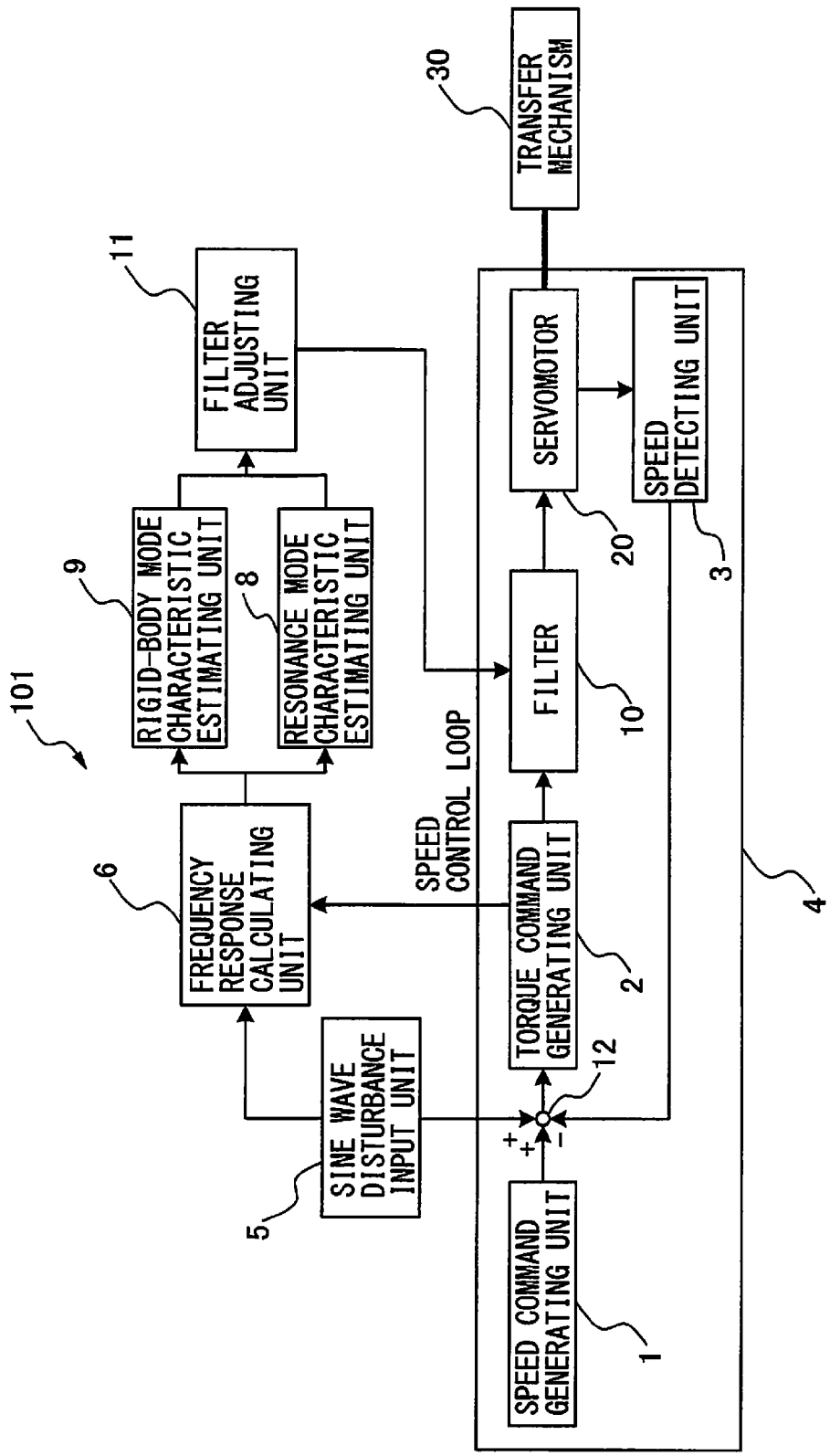
FIG. 1 is a diagram illustrating a configuration of a servo control device according to a first embodiment of the present invention.

First, a servo control device according to a first embodiment of the present invention is described. FIG. 1 is a diagram illustrating a configuration of a servo control device according to the first embodiment of the present invention. A servo control device 101 according to the first embodiment of the present invention includes: a speed command generating unit 1, which generates a speed command value for a servomotor; a torque command generating unit 2, which generates a torque command value for the servomotor on the basis of the speed command value; a speed detecting unit 3, which detects the speed of the servomotor driven based on the torque command value; a speed control loop 4, which includes the speed command generating unit 1, the torque command generating unit 2, and the speed detecting unit 3; a sine wave disturbance input unit 5, which inputs sine wave disturbance to the speed control loop 4; a frequency response calculating unit 6, which, on the basis of an output from the speed control loop 4 when the sine wave disturbance is input to the speed control loop 4, estimates a frequency response including the gain and the phase of the input/output signals of the speed control loop; a resonance frequency detecting unit (not illustrated), which detects a resonance frequency, i.e. the frequency at which the gain of the frequency response is local maximum; a resonance mode characteristic estimating unit 8, which estimates resonance characteristics based on the frequency response at the resonance frequency and frequencies around the resonance frequency; a rigid-body mode characteristic estimating unit 9, which estimates rigid-body characteristics based on the frequency response in a low-frequency band; a filter 10, which attenuates components in a particular frequency band included in a torque command; and a filter adjusting unit 11, which makes setting of the filter 10 so that the filter 10 has specified filter characteristics. The filter adjusting unit 11 further includes a filter adjusting part, which attenuates components in a frequency band corresponding to a resonance mode estimated by the resonance mode characteristic estimating unit 8.

The servo control device according to the first embodiment of the present invention is capable of performing automatic filter adjustment in which the characteristics of a transfer mechanism are obtained from the open-loop characteristics instead of a loop sequence, and the filter is automatically adjusted through physical consideration. The servo control device according to the first embodiment of the present invention makes the setting of the filter in a torque command while making quantitative evaluation, by adjusting a filter based on a modal analysis, which identifies a characteristic value of a resonance mode on the basis of a frequency response at a resonance frequency and frequencies around the resonance frequency to obtain the characteristic value as a physical quantity representing the characteristics of the transfer mechanism.

Figure 2:
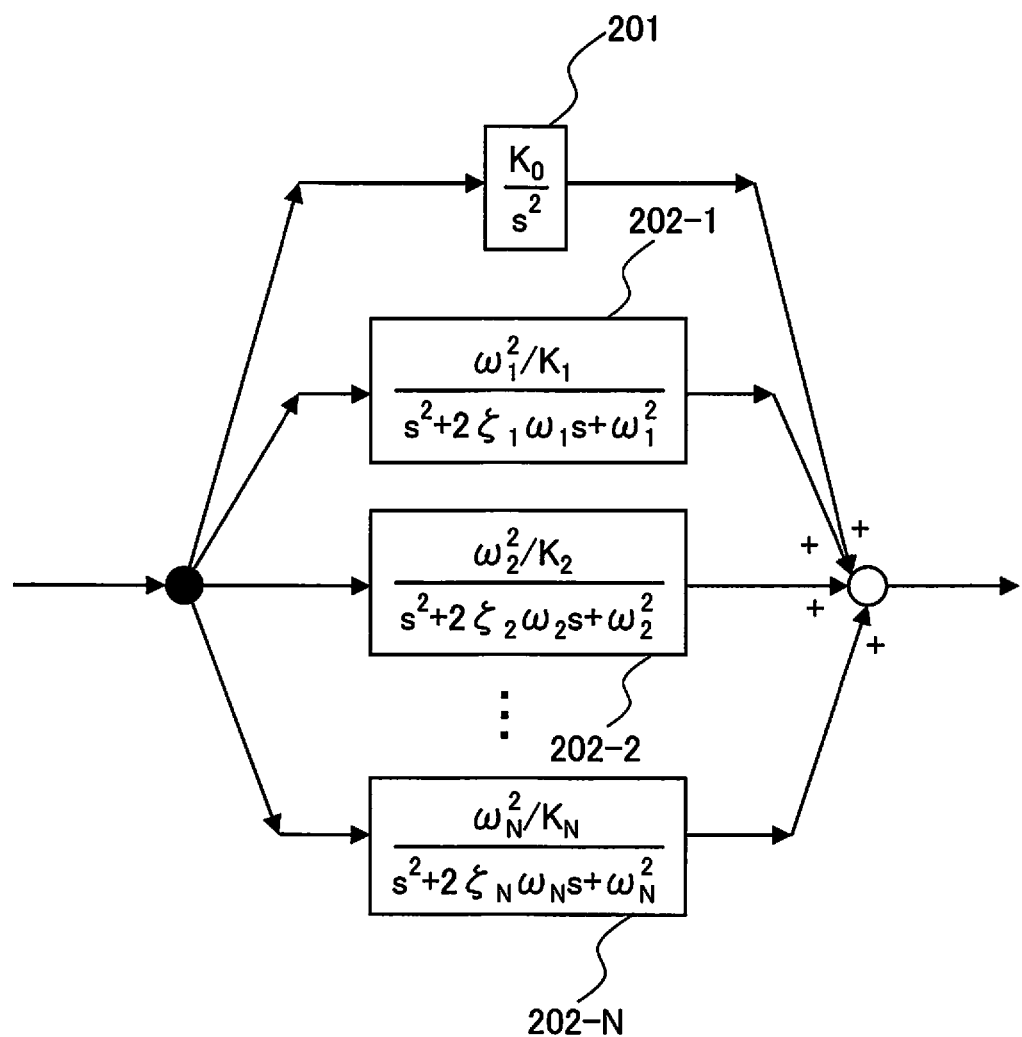
FIG. 2 is a block diagram expressing a transfer function of a mechanical transfer mechanism by the sum of secondary systems.

A method referred to as experimental modal analysis is employed to analyze mechanical oscillation (whereas theoretical modal analysis is a so-referred to as finite-element method). Experimental modal analysis is an analysis technique of actually measuring a frequency response and calculating a characteristic value from the measurement result. Assume that there are a number of independent spring-mass-damper systems. In this case, a set of independent equations of motion are obtained from the systems. On the basis of this idea of the modal analysis, the transfer function of a mechanical transfer mechanism can be expressed by the sum of secondary systems as presented in FIG. 2. Each of the secondary systems (202-1, 202-2, . . . , 202-N) is referred to as a "resonance mode", and a term 201, which includes an integrator only, is referred to as a "rigid-body mode". In FIG. 2, each of $K_0, K_1, \ldots, K_N$ denotes a gain, each of $\zeta_1, \zeta_2, \ldots, \zeta_N$ denotes a damping ratio, and each of $\omega_1, \omega_2, \ldots, \omega_N$ denotes a resonance frequency. Experimental modal analysis is to determine parameters of the transfer function thus represented, on the basis of actually measured values. With this representation, parameters can be determined for each mode by the half-power bandwidth method.

The control block diagrams depicted in FIGS. 3A and 3B each illustrate, as a continuous system, the components of the corresponding one of speed control loops 4 and 4' in a motor drive system which inputs ω* and outputs ω. The block diagram illustrating the speed control loop 4 in FIG. 3A includes an adder 12, a speed controller (torque command generating unit) 2, a notch filter 10, a resonance mode 13, and a differentiator 14. In the block diagram of the speed control loop 4' in FIG. 3B, the differentiator appears to be cancelled, because an integrator of a speed controller 2' is involved. This is on account of the control structure and not measurement. In the speed controllers 2 and 2', $k_{vp}$ denotes a speed proportional gain, and $k_{vi}$ denotes a speed integral gain.

After resonance mode characteristics are thus obtained, a filter adjusting part (not illustrated) of the filter adjusting unit 11 attenuates components in the frequency band corresponding to a resonance mode estimated by the resonance mode characteristic estimating unit 8.

Thus, the servo control device according to the first embodiment is capable of making the setting of the filter in a torque command while making quantitative evaluation, by identifying the characteristic value of a resonance mode on the basis of a frequency response at a resonance frequency and frequencies around the resonance frequency to obtain the characteristic value as a physical quantity representing the characteristics of the transfer mechanism.

Second Embodiment

Priorities for Filter Adjustment

Next, a servo control device according to a second embodiment of the present invention is described. The servo control device according to the second embodiment of the present invention has the following feature. The filter adjusting part makes the setting of the filter by representing a frequency response of the speed control loop 4 by the use of at least one of the characteristics of the resonance mode estimated by the resonance mode characteristic estimating unit 8 and the single characteristic of the rigid-body mode estimated by the rigid-body mode characteristic estimating unit 9, comparing the energy in the resonance mode and the corresponding energy of the rigid-body mode in a particular frequency range, and thereby selecting a mode having a high oscillation possibility in the speed control loop 4. The rest of the configuration of the servo control device according to the second embodiment is substantially the same as that of the servo control device according to the first embodiment, and hence the detailed description thereof is omitted.

For the application of a finite number of filters, the servo control device according to the second embodiment of the present invention determines resonance frequencies to which the filters are to be applied with high priorities. The servo control device makes oscillation risk evaluation on the basis of physical evidence using the ratio between rigid-body mode energy and resonance mode energy.

It is convenient to display a frequency response by using a logarithmic scale in view of the fact that the frequency range is usually wide. For this reason, a Bode plot, which is easy to intuitively understand the characteristics, as that presented in FIG. 4A is widely used.

Figure 4A:
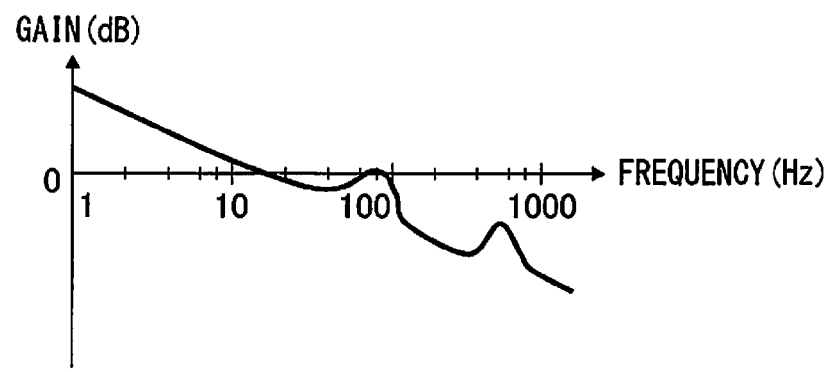
FIG. 4A is a graph illustrating an example of frequency characteristics of gain.
Figure 4B:
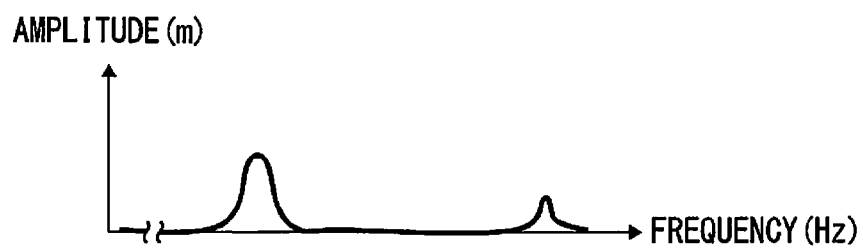
FIG. 4B is a graph illustrating an example of frequency characteristics of amplitude.
Figure 4C:
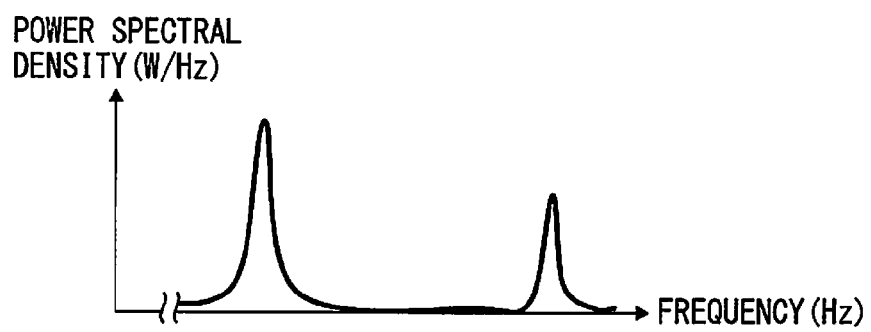
FIG. 4C is a graph illustrating an example of frequency characteristics of power spectral density.

It is possible to express gain (dB) with amplitude values as presented in FIG. 4B by converting the frequency response illustrated in FIG. 4A to that in the form of a linear axis. Although a logarithmic axis is convenient to present a wide range, a linear axis is more suitable to present particular ranges at regular intervals. The power spectral densities as those presented in FIG. 4C are obtained by squaring the vertical-axis data (amplitudes) of the frequency-amplitude graph.

Figure 5A:
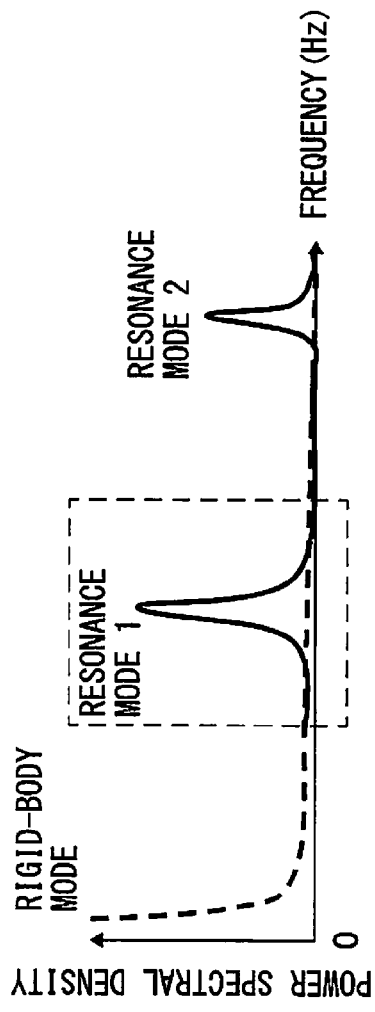
FIG. 5A is a graph for illustrating a method for calculating energies in a rigid-body mode and a resonance mode base on the frequency characteristics of the power spectral density.
Figure 5B:
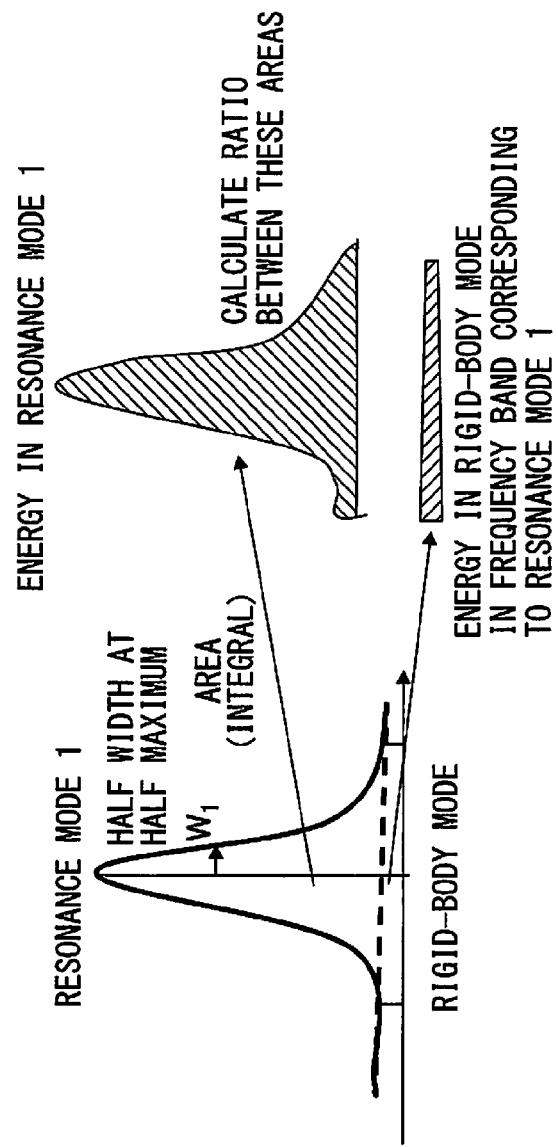
FIG. 5B is a diagram for illustrating the method for calculating energies in the rigid-body mode and the resonance mode from the frequency characteristics of the power spectral density.

Any periodic time data can be transformed to power spectral density as those presented in FIG. 5A, through Fourier Transform. This corresponds to using results obtained by performing Fourier transform on a response waveform for a sine wave input. The result obtained by integrating the power spectral density on a frequency axis shows the energy of a corresponding signal. As illustrated in FIG. 5B, signal energy in a particular frequency band can be estimated by integral operation.

The gain in the rigid-body mode is drastically attenuated at a low frequency and becomes so small as to be ignored in a frequency band where the gain in the resonance mode is prominent.

The characteristics of the transfer mechanism are to be such rigid-body characteristics in principle (ideal characteristics). However, an actual transfer mechanism includes a number of resonance factors (spring-mass-damper factors). In view of this, energies in a resonance mode and the rigid-body mode are calculated and are used to obtain a ratio therebetween, in order to thereby estimate the "degree of difference in comparison with ideal characteristics".

For example, in the example illustrated in FIGS. 5A and 5B, the mechanical characteristics are described as follows.

$$M(s) = \frac{K_0}{s^2} + \frac{\omega_1^2/K_1}{s^2 + 2\zeta_1\omega_1 s + \omega_1^2} + \frac{\omega_2^2/K_2}{s^2 + 2\zeta_2\omega_2 s + \omega_2^2} = M_0(s) + M_1(s) + M_2(s)$$

Assume that the half widths at half maximum in the primary mode (resonance mode 1) and the secondary mode (resonance mode 2) are denoted by $W_1$ and $W_2$, respectively. Then, each integral range is expressed as follows by using an appropriate constant n (>1).

Energy in primary mode $$E_1 = \int_{\omega_1 - nW_1}^{\omega_1 + nW_1} |M_1(j\omega)|^2 d\omega$$

Corresponding energy in rigid-body mode $$E_{01} = \int_{\omega_1 - nW_1}^{\omega_1 + nW_1} |M_0(j\omega)|^2 d\omega$$

Energy in secondary mode $$E_2 = \int_{\omega_2 - nW_2}^{\omega_2 + nW_2} |M_2(j\omega)|^2 d\omega$$

Corresponding energy in rigid-body mode $$E_{02} = \int_{\omega_2 - nW_2}^{\omega_2 + nW_2} |M_0(j\omega)|^2 d\omega$$

Ratios η of these energies are calculated. Specifically, ratios $\eta_1$ and $\eta_2$ are obtained according to the following equations.

$$\eta_1 = \frac{E_1}{E_{01}} = \frac{\int_{\omega_1 - nW_1}^{\omega_1 + nW_1} |M_1(j\omega)|^2 d\omega}{\int_{\omega_1 - nW_1}^{\omega_1 + nW_1} |M_0(j\omega)|^2 d\omega}$$

$$\eta_2 = \frac{E_2}{E_{02}} = \frac{\int_{\omega_2 - nW_2}^{\omega_2 + nW_2} |M_2(j\omega)|^2 d\omega}{\int_{\omega_2 - nW_2}^{\omega_2 + nW_2} |M_2(j\omega)|^2 d\omega}$$

A ratio η having a larger value is considered to indicate that the "difference" from the rigid-body mode is larger. Accordingly, a filter is to be applied to such a mode with a high priority.

Since the power spectral density in the rigid-body mode is smaller at a higher frequency, the evaluation value for η is larger at a higher frequency. When there are multiple resonances having similar amplitude ratios, a higher-frequency resonance can be selected with a higher priority. Note, however, that, since resonances on the lower-frequency side are dealt with the characteristics of the control system in some cases, lower priorities are usually assigned to such resonances.

Next, an operation procedure of the servo control device according to the second embodiment of the present invention is described with reference to the flowchart illustrated in FIG. 6. First, in Step S101, the sine wave disturbance input unit 5 (refer to FIG. 1) inputs sine wave disturbance to the speed control loop 4.

Then, in Step S102, the speed detecting unit 3 detects a speed value of the servomotor 20. The speed of the servomotor 20 can be detected by the use of an encoder or the like.

Then, in Step S103, the torque command generating unit 2 generates a torque command value on the basis of the speed command value and the detected speed value.

Then, in Step S104, the frequency response calculating unit 6 calculates a frequency response on the basis of the sine wave disturbance value and the torque command value.

Then, in Step S105, the rigid-body mode characteristic estimating unit 9 estimates a single characteristic value of the rigid-body mode on the basis of the frequency response.

Then, in Step S106, the resonance mode characteristic estimating unit 8 estimates a set of characteristic values of at least one resonance mode on the basis of the frequency response.

Figure 7:
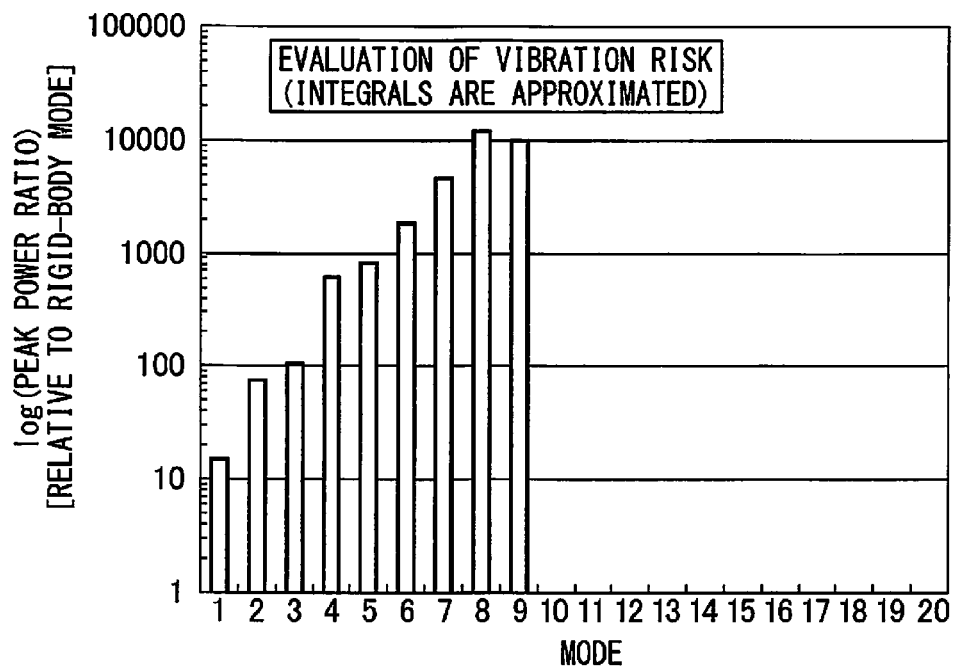
FIG. 7 is a graph representing mode dependence of peak power ratio.

Then, in Step S107, the filter adjusting unit 11 calculates the energy in each resonance mode and the corresponding energy in the rigid-body mode, obtains a ratio between the energies and determines priorities of the resonance modes by which the filter 10 is to be applied. The peak power ratios of multiple modes are presented in FIG. 7 as an example.

Then, in Step S108, the filter adjusting unit 11 adjusts the filter characteristics for the resonance modes in order from those of the resonance mode with higher priority.

As described above, for the application of a finite number of filters, the servo control device according to the second embodiment determines resonance frequencies to which filters are to be applied with high priorities. As a result, the servo control device can make oscillation risk evaluation on the basis of physical evidence using the ratio between rigid-body mode energy and each resonance mode energy.

Third Embodiment

Prediction and Display of Filter Effect

Next, a servo control device according to a third embodiment of the present invention is described. The servo control device according to the third embodiment of the present invention has the following feature. The frequency response calculating unit 6 estimates a transfer function of a transfer mechanism 30 on the basis of mode characteristics estimated by the resonance mode characteristic estimating unit 8 and the rigid-body mode characteristic estimating unit 9 and curve fitting is performed on a frequency response curve obtained through experimental measurement. Thereby, the effect of a filter to be applied is predicted according to a mathematical expression. The result obtained by the prediction is displayed as a Bode plot. The rest of the configuration of the servo control device according to the third embodiment is substantially the same as that of the servo control device according to the first embodiment, and hence the detailed description thereof is omitted.

Figure 8:
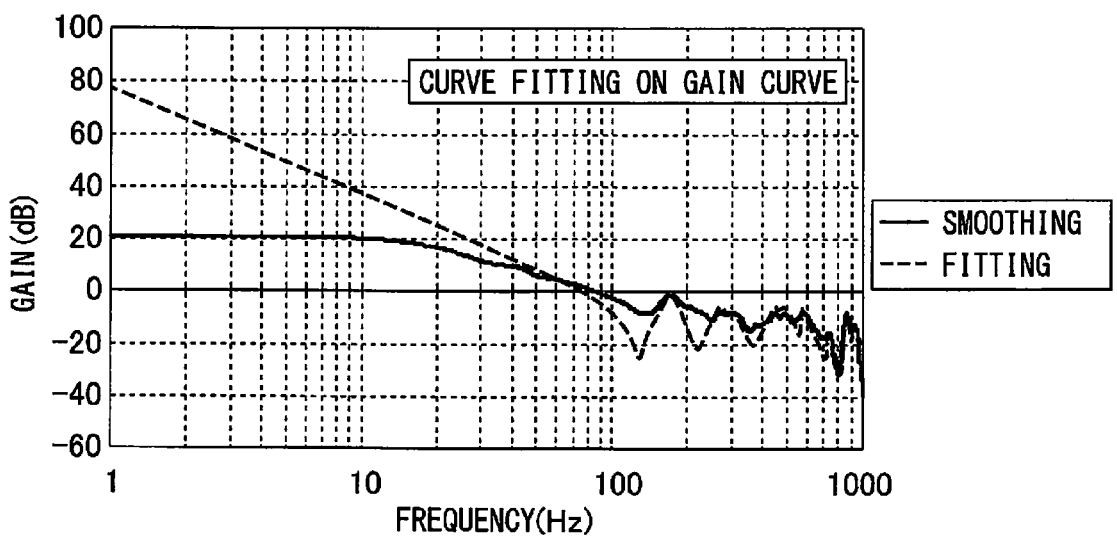
FIG. 8 is a graph representing frequency characteristics of a gain after fitting and after smoothing.
Figure 9:
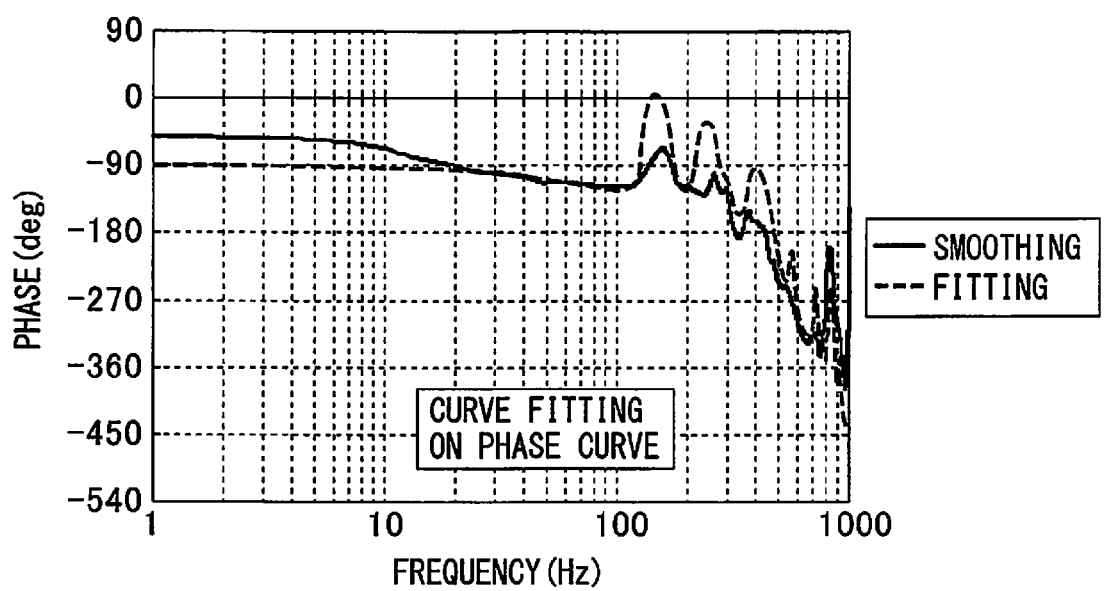
FIG. 9 is a graph representing frequency characteristics of a phase after fitting and after smoothing.

The servo control device according to the third embodiment of the present invention can obtain a transfer function expression representing a frequency response. Accordingly, the servo control device can predict how the frequency response changes as a result of filter application, without repeating actual measurement. It is possible to estimate filter adjustment to be performed before the completion of the adjustment by depicting a Bode plot incorporating the transfer function of the notch filter. As an example, FIG. 8 is a graph representing frequency characteristics of a gain after smoothing and after fitting. FIG. 9 is a graph representing frequency characteristics of a phase after smoothing and after fitting. The transfer function representing a notch filter (IIR) can be expressed by the following expression.

$$\frac{s^2 + 2\delta\tau\omega_c s + \omega_c^2}{s^2 + 2\tau\omega_c s + \omega_c^2}$$

Note that $\delta$ denotes a parameter for determining a damping amount (notch depth) for an oscillation component, $\tau$ denotes a parameter for determining the width of a damping band (notch width), and $\omega_c$ is a center frequency of the damping band.

When the frequency to which a filter is to be applied is determined by the method described in the second embodiment, the characteristics of the notch filter can be determined. For example, assume that one of the resonance modes is expressed by the following expression.

$$\frac{\omega_1^2/K_1}{s^2 + 2\zeta_1\omega_1 s + \omega_1^2}$$

In this case, setting the notch filter as follows surely stabilizes the system.

$$\omega_c = \omega_r$$
$$\tau = \zeta_r$$
$$\delta = \frac{\omega_r^2}{K_r}$$

Here, $K_r$, $\zeta_r$, and $\omega_r$ respectively denote the gain, the damping constant, and the natural angular frequency of the main resonance mode.

When the result of the experimental modal analysis is obtained and the constant for the filter to be applied is determined, a frequency response after the filter application can be predicted by calculation, and the predicted response can be displayed. In general cases, a control device is actually operated to drive the motor for servo adjustment. However, since the characteristics of the actual device can be identified by this method, filter adjustment is possible without operating the actual device after the modal analysis is completed once.

As described above, the servo control device according to the third embodiment of the present invention can obtain a transfer function expression representing a frequency response, which makes it possible to estimate how the frequency response changes as a result of filter application, without repeating actual measurement. By depicting a Bode plot incorporating the transfer function of the notch filter, it is possible to estimate filter adjustment to be performed before the completion of the adjustment.

As described above, the servo control device according to one of the embodiments of the present invention analyzes the frequency response of the control system through a modal analysis, calculates a characteristic value for each resonance mode to evaluate the oscillation risk for the mode, and determines priorities to be assigned to the frequencies to which the filter is to be applied. Since the width and the depth of the filter are determined on the basis of the characteristics of each corresponding mode, the filter can be automatically adjusted with high accuracy.

What is claimed is:

1. A servo control device comprising:
   a speed command generating unit configured to generate a speed command value for a servomotor;
   a torque command generating unit configured to generate a torque command value for the servo motor based on the speed command value;
   a speed detecting unit configured to detect speed of the servomotor driven based on the torque command value;
   a speed control loop configured to include the speed command generating unit, the torque command generating unit, and the speed detecting unit;
   a sine wave disturbance input unit configured to input sine wave disturbance to the speed control loop;
   a frequency response calculating unit configured to estimate a frequency response including a gain and a phase of speed control loop input/output signals based on an output from the speed control loop at time when the sine wave disturbance is input to the speed control loop;
   a resonance frequency detecting unit configured to detect a resonance frequency, at which the gain of the frequency response is local maximum;
   a resonance mode characteristic estimating unit configured to estimate a resonance characteristic from the frequency response at the resonance frequency and frequencies around the resonance frequency;
   a rigid-body mode characteristic estimating unit configured to estimate a rigid-body characteristic from the frequency response in a low-frequency band;
   a filter configured to attenuate a component in a particular frequency band included in a torque command; and
   a filter adjusting unit configured to make setting of the filter so that the filter has a specified characteristic,
   wherein the filter adjusting unit further includes a filter adjusting part configured to attenuate a component in a frequency band corresponding to a resonance mode estimated by the resonance mode characteristic estimating unit.

2. The servo control device according to claim 1, wherein the filter adjusting part makes setting of the filter by expressing the frequency response of the speed control loop by using at least one resonance mode characteristic estimated by the resonance mode characteristic estimating unit and a single rigid-body mode characteristic estimated by the rigid-body mode characteristic estimating unit, comparing energy in the resonance mode and corresponding energy in the rigid-body mode in a particular frequency range, and selecting a mode having a high oscillation possibility in the speed control loop.

3. The servo control device according to claim 1, wherein the frequency response calculating unit predicts effect of a filter to be applied according to a mathematical expression, by estimating a transfer function of a transfer mechanism from mode characteristics estimated by the resonance mode characteristic estimating unit and the rigid-body characteristic estimating unit and performing curve fitting on a frequency response curve obtained through experimental measurement, and displays an obtained result as a Bode plot.

* * * * *